United States Patent Office 3,642,883
Patented Feb. 15, 1972

3,642,883
PROCESS FOR REMOVAL OF AROMATIC BROMINE IN BENZOIC ACID PRODUCTION
James A. Jackson, Fords, N.J., assignor to Standard Oil Company, Chicago, Ill.
No Drawing. Filed Dec. 16, 1968, Ser. No. 784,207
Int. Cl. C07c 51/42
U.S. Cl. 260—525      4 Claims

ABSTRACT OF THE DISCLOSURE

Bromobenzoic acid produced as a byproduct in the bromide promoted liquid phase air oxidation of monoalkylbenzenes to benzoic acid is converted to benzoic acid by reaction with zinc or iron.

---

This invention relates to the production of benzoic acid by the bromine-promoted liquid phase oxidation of monoalkylbenzenes to benzoic acid. More particularly, this invention relates to a method of improving the purity of the benzoic acid product.

Methods for the preparation and recovery of benzoic acid by liquid phase oxidation of monoalkylbenzenes in the presence of bromide and a heavy metal catalyst are known and disclosed, for example, in French Patents 1,295,734 and 1,307,392. In a preferred embodiment of such a process, liquid benzoic acid, monoalkylbenzene charge stock and a heavy metal oxidation catalyst such as manganese or cobalt are continuously charged to a reactor which is additionally equipped with a source of molecular oxygen such as air. Reactor contents are circulated through an external vertical cooler where excess heat of reaction is removed, and the cooled liquid contents comprising principally benzoic acid, catalyst and impurities are returned to the reactor with added catalyst and charge stock. A small fraction of the recirculating reactor effluent is continuously removed from the external cooler as reactor product, corresponding in amount to the amount of benzoic acid being produced in the oxidation zone.

Benzoic acid can be recovered from the reactor product fraction by a two-step fractionation process. Heavy ends together with some light ends are separated in a first distillation zone and the overhead fraction charged to a second distillation zone where the product benzoic acid fraction is taken. Bottoms from the primary distillation zone are withdrawn to a primary still bottoms hold drum from which they are sent as feed to a residual stripper which is operated batchwise. Overhead from the residual stripper together with bottoms from the second distillation zone are recycled as feed to the primary still.

One of the impurities contained in benzoic acid prepared by the method described is about 300 to 350 p.p.m. of a bromine-substituted benzoic acid. Bromobenzoic acid is an undesirable contaminant because of its extreme corrosiveness, although concentrations below about 30 p.p.m. are commercially acceptable. Preferably, however, bromobenzoic acid levels should be below about 10 p.p.m. Although addition distillation steps can reduce bromobenzoic acid levels below the 300 to 350 p.p.m. usually found in the product, such distillations add significantly to production costs.

I have now discovered a method for reducing the bromobenzoic acid levels in benzoic acid produced as herein described without the necessity of additional distillation steps. My invention comprises adding metallic zinc or iron to crude benzoic acid containing bromobenzoic acid contaminants. I have found that by such use of metallic zinc or iron, the aromatic bromine in the bromobenzoic acid is reduced to an inorganic bromide with concomitant formation of benzoic acid, resulting in a product containing less than 30 parts per million bromobenzoic acid.

The metallic zinc or iron can be added to the crude benzoic acid stream any time after the stream is withdrawn from the external cooling loop of the reactor, but I have found that it is especially advantageous to add the metal to the bottoms fraction from the primary distillation zone. The addition of the metal is conveniently conducted by introducing a slurry of metal in benzoic acid into the primary still bottoms hold drum. The amount of metal employed should be in excess of the stoichiometric amount necessary to reduce all aromatic bromine to inorganic bromide.

The metal contacting step can be suitably carried out at any temperature between the melting point of the primary still bottoms and the distillation temperature of the first frictionation zone. The length of time necessary to reduce the aromatic bromine to an acceptable level will, of course, vary with temperature of the contacting step and the amount of metal present. I have found, for example, that if the primary still bottoms are discharged into the hold drum and allowed to contact an excess of metallic zinc for about 6 or more hours, upwards of 80 percent of the bromobenzoic acid present is converted to zinc bromide and benzoic acid.

An alternative embodiment of my invention can comprise percolating the hot primary fraction bottoms through a closely packed bed of zinc metal and subsequently recycling the treated bottoms to the primary distillation zone. In addition, it will be obvious to one skilled in the art that many other specific procedures for contacting the crude benzoic acid stream with metallic zinc or iron can be devised which are within the scope of my invention.

The following examples are offered as illlustrations of my process and are not intended as limitations on its scope.

EXAMPLE I

Benzoic acid containing 0.05 weight percent bromobenzoic acid was contacted at 160° F. with a molar excess of metallic zinc. Periodic analyses showed the amount of bromobenzoic acid to be steadily decreasing.

| Reaction time (hours): | Weight percent bromobenzoic acid in benzoic acid |
|---|---|
| 0 | 0.050 |
| 2 | 0.011 |
| 6 | 0.010 |
| 14 | 0.009 |
| 22 | 0.008 |
| 30 | 0.006 |

EXAMPLE II

Benzoic acid containing 0.05 weight percent bromobenzoic acid was contacted at 160° F. with a molar excess of metallic iron. Periodic analyses showed the bromobenzoic acid concentration to be decreasing.

| Reaction time (hours): | Weight percent bromobenzoic acid in benzoic acid |
|---|---|
| 0 | 0.050 |
| 2 | 0.039 |
| 6 | 0.020 |
| 14 | 0.021 |
| 22 | 0.019 |
| 30 | 0.019 |

Having described my invention I claim:
1. In the process of producing benzoic acid from the liquid phase molecular oxygen oxidation of monoalkylbenzenes in the presence of bromine and heavy metal oxidation catalyst which produces bromobenzoic acid as contaminant in the recovered benzoic acid product, the improvement comprising contacting such contaminated benzoic acid product in the liquid state with solid metallic zinc or iron in an amount in excess of the stoichiometric quantity required to form bromides of said metals and separating the resulting benzoic acid product from the metal bromide.

2. The process of claim 1 in which the metallic zinc or iron is contacted with the bottoms fraction from the primary still of a two-stage product distillation zone.

3. The process of claim 2 in which the contacting step is from about 6 to about 24 hours in duration.

4. The process of claim 3 in which subsequent to the metal contacting step the treated bottoms fraction is sent batchwise to a stripping zone where benzoic acid is separated overhead and recycled to the primary still of the product distillation zone.

References Cited

FOREIGN PATENTS 1,295,734  5/1962  France _____ 260—524

OTHER REFERENCES

Fieser et al.: "Organic Chemistry," 3rd edition, 1956, pp. 58 and 543–4.

LORRAINE A. WEINBERGER, Primary Examiner

R. S. WEISSBERG, Assistant Examiner